United States Patent
Zyren et al.

(10) Patent No.: US 9,026,813 B2
(45) Date of Patent: May 5, 2015

(54) ESTABLISHING A POWER CHARGING ASSOCIATION ON A POWERLINE NETWORK

(75) Inventors: James Zyren, Melbourne Beach, FL (US); Srinivas Katar, Gainesville, FL (US); Manjunath Krishnam, Gainesville, FL (US); Lawrence W. Yonge, III, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 505 days.

(21) Appl. No.: 12/980,758

(22) Filed: Dec. 29, 2010

(65) Prior Publication Data

US 2012/0131360 A1    May 24, 2012

Related U.S. Application Data

(60) Provisional application No. 61/416,183, filed on Nov. 22, 2010.

(51) Int. Cl.
*G06F 15/16* (2006.01)
*G06F 1/26* (2006.01)
*G06F 1/00* (2006.01)
*G06F 1/32* (2006.01)
*H04L 12/10* (2006.01)

(52) U.S. Cl.
CPC .............. *G06F 1/3203* (2013.01); *G06F 1/26* (2013.01); *H04L 12/10* (2013.01)

(58) Field of Classification Search
CPC .......... H04L 12/10; G06F 1/3203; G06F 1/26
USPC ........................................................ 713/310
See application file for complete search history.

(56) References Cited

U.S. PATENT DOCUMENTS 4,862,122 A * 8/1989 Blair et al. .............. 333/202
5,341,083 A   8/1994 Klontz et al.
(Continued)

FOREIGN PATENT DOCUMENTS

CN    103765857    4/2014
CN    103843304    6/2014
(Continued)

OTHER PUBLICATIONS

International Search Report and Written Opinion—PCT/US2011/061360—ISA/EPO—Mar. 15, 2012, 13 pages.
(Continued)

*Primary Examiner* — Thomas Lee
*Assistant Examiner* — Robert Cassity
(74) *Attorney, Agent, or Firm* — DeLizio Gilliam, PLLC

(57) ABSTRACT

Associating service agents in communication over a network to one or more respective clients coupled to the network at respective ports of the network is described. At a first service agent, a first signal is received from a first client coupled to the network at a first port. The first signal propagates over a first signal propagation path between the first service agent and the first port. An association between the first service agent and the first client is established based at least in part on a difference between: the first signal propagation path between the first service agent and the first port, and a second signal propagation path between the first service agent and a second port or between a second service agent and the first port.

30 Claims, 8 Drawing Sheets

(56) References Cited

U.S. PATENT DOCUMENTS

| | | | |
|---|---|---|---|
| 6,182,139 B1* | 1/2001 | Brendel | 709/226 |
| 6,252,674 B1* | 6/2001 | Takaoka | 358/1.5 |
| 6,396,241 B1 | 5/2002 | Ramos et al. | |
| 6,978,142 B2 | 12/2005 | Jokimies | |
| 8,161,547 B1 | 4/2012 | Jennings et al. | |
| 8,429,396 B1 | 4/2013 | Trivedi et al. | |
| 2003/0125058 A1 | 7/2003 | Matsutani et al. | |
| 2004/0252668 A1 | 12/2004 | Ozukturk et al. | |
| 2005/0215263 A1 | 9/2005 | Tsien et al. | |
| 2005/0273803 A1 | 12/2005 | Takagi et al. | |
| 2006/0014547 A1* | 1/2006 | Walter | 455/456.1 |
| 2006/0136457 A1 | 6/2006 | Park et al. | |
| 2006/0195464 A1* | 8/2006 | Guo | 707/101 |
| 2007/0091864 A1 | 4/2007 | Honjo et al. | |
| 2007/0230506 A1 | 10/2007 | Zou | |
| 2008/0025382 A1* | 1/2008 | Okado | 375/222 |
| 2008/0040296 A1* | 2/2008 | Bridges et al. | 705/412 |
| 2008/0155093 A1* | 6/2008 | Dharmistan | 709/224 |
| 2008/0228613 A1 | 9/2008 | Alexander | |
| 2008/0270528 A1 | 10/2008 | Girardeau et al. | |
| 2008/0301446 A1 | 12/2008 | Yonge, III et al. | |
| 2009/0091291 A1 | 4/2009 | Woody et al. | |
| 2009/0261779 A1 | 10/2009 | Zyren | |
| 2009/0288129 A1 | 11/2009 | Wolfe et al. | |
| 2010/0049610 A1 | 2/2010 | Ambrosio et al. | |
| 2010/0161481 A1 | 6/2010 | Littrell | |
| 2010/0161482 A1* | 6/2010 | Littrell | 705/40 |
| 2010/0161518 A1 | 6/2010 | Littrell | |
| 2010/0211643 A1 | 8/2010 | Lowenthal et al. | |
| 2010/0269153 A1 | 10/2010 | Kato et al. | |
| 2010/0274570 A1 | 10/2010 | Proefke et al. | |
| 2010/0274697 A1 | 10/2010 | Zyren | |
| 2010/0315197 A1 | 12/2010 | Solomon et al. | |
| 2011/0010043 A1 | 1/2011 | Lafky | |
| 2011/0022641 A1 | 1/2011 | Werth et al. | |
| 2011/0025267 A1 | 2/2011 | Kamen et al. | |
| 2011/0096682 A1 | 4/2011 | Koch et al. | |
| 2011/0099376 A1 | 4/2011 | Gupta et al. | |
| 2011/0144844 A1 | 6/2011 | Ishibashi | |
| 2011/0184587 A1 | 7/2011 | Vamos et al. | |
| 2011/0191265 A1 | 8/2011 | Lowenthal et al. | |
| 2011/0195738 A1 | 8/2011 | Hapsari et al. | |
| 2011/0213983 A1 | 9/2011 | Staugaitis et al. | |
| 2011/0241824 A1 | 10/2011 | Uesugi | |
| 2011/0254505 A1* | 10/2011 | Evander et al. | 320/109 |
| 2011/0264530 A1 | 10/2011 | Santangelo et al. | |
| 2011/0279082 A1 | 11/2011 | Hagenmaier, Jr. et al. | |
| 2012/0089286 A1 | 4/2012 | Nakata | |
| 2012/0281582 A1* | 11/2012 | Yang et al. | 370/252 |
| 2013/0038424 A1 | 2/2013 | Katar et al. | |
| 2013/0160086 A1 | 6/2013 | Katar et al. | |

FOREIGN PATENT DOCUMENTS

| | | | |
|---|---|---|---|
| EP | 0862346 A2 | | 9/1988 |
| EP | 1180886 A1 | | 2/2002 |
| EP | 1324546 A1 | * | 7/2003 |
| EP | 1324546 A1 | | 7/2003 |
| EP | 2222107 | | 8/2010 |
| GB | 2472537 A | | 2/2011 |
| JP | 2003012099 | | 1/2003 |
| JP | 2006158087 | | 6/2006 |
| JP | 2006262570 | | 9/2006 |
| JP | 2007069923 | | 3/2007 |
| JP | 2007110373 | | 4/2007 |
| JP | 2008077267 | | 4/2008 |
| JP | 2008227614 | | 9/2008 |
| JP | 2009094768 | | 4/2009 |
| JP | 2009254052 | | 10/2009 |
| JP | 2010017006 | | 1/2010 |
| JP | 2010074336 | | 4/2010 |
| JP | 2010079583 | | 4/2010 |
| JP | 2010206655 | | 9/2010 |
| JP | 2011034500 | | 2/2011 |
| JP | 2014523579 | | 8/2014 |
| JP | 2014524695 | | 9/2014 |
| KR | 20080007188 | | 1/2008 |
| KR | 1020100003315 | | 7/2011 |
| WO | WO 9530263 A1 | * | 11/1995 |
| WO | WO9530263 A1 | | 11/1995 |
| WO | 2004109439 | | 12/2004 |
| WO | WO 2004109439 A2 | * | 12/2004 |
| WO | WO2004109439 A2 | | 12/2004 |
| WO | 2010009502 A1 | | 1/2010 |
| WO | WO2010043659 A1 | | 4/2010 |
| WO | 2010064515 | | 10/2010 |
| WO | 2011044543 | | 4/2011 |
| WO | 2011154218 | | 12/2011 |
| WO | 2012071263 | | 5/2012 |
| WO | 2013023164 | | 2/2013 |

OTHER PUBLICATIONS

Co pending U.S. Appl. No. 61/522,184, Aug. 10, 2011, 49 pages.
"PCT Application No. PCT/US2011/061360 International Preliminary Report on Patentability", Mar. 6, 2013 , 8 pages.
"PCT Application No. PCT/US2012/050402 International Search Report", Mar. 1, 2013 , 12 pages.
Co-pending U.S. Appl. No. 13/527,486, filed on Jun. 19, 2012.
Co-pending U.S. Appl. No. 61/499,562, filed on Jun. 21, 2011.
International Search Report and Written Opinion—PCT/US2012/043415—ISA/EPO—Oct. 10, 2012.
"PCT Application No. PCT/US2012/043415 Written Opinion of the IPEA", May 21, 2013 , 5 pages.
"U.S. Appl. No. 13/527,486 Office Action", Jul. 26, 2013 , 49 pages.
"PCT Application No. PCT/US2012/050402 International Preliminary Report on Patentability", Nov. 26, 2013, 8 pages.
"U.S. Appl. No. 13/527,486 Final Office Action", Jan. 6, 2014 , 46 pages.
HomePlug Green PHY Specification Release Version 1.00, HomePlug Powerline Alliance, Jun. 14, 2010, 726 pages.
Co-pending U.S. Appl. No. 13/564,358, filed on Aug. 1, 2012.
"U.S. Appl. No. 13/527,486 Office Action", Jun. 10, 2014, 68 pages.
"Japanese Patent Application No. 2013-540046, Office Action", May 20, 2014, 12 pages.
"Taiwan Patent Application No. 101129015 Office Action", May 26, 2014, 11 pages.
"Taiwan Search Report—TW101129015—TIPO—May 22, 2014.", May 22, 2014, 1 page.
"U.S. Appl. No. 13/564,358 Office Action", May 8, 2014, 24 pages.
"Korean Patent Application No. 2013-7015957, KIPO Notice of Grounds for Rejection", Oct. 23, 2014, 10 pages.
"Korean Patent Application No. 1020147001689, Kipo Notice of Grounds for Rejection", Oct. 28, 2014, 23 pages.
"Korean Patent Application No. 10-2014-0047159, KIPO Notice of Grounds for Rejection", Jan. 19, 2015, 6 pages.
"Japanese Patent Application No. 2014-517134, Office Action", Dec. 17, 2014, 7 pages.
"Japanese Patent Application No. 2014-525181, Office Action", Feb. 24, 2015, 9 pages.
Kazuya, Monden et al., "Multi-service System on Mesh Networks", IEICE Technical Report, Japan, The Institute of Electronics, Information and Communication Engineers, vol. 109, No. 443 Feb. 25, 2010 , pp. 65-70.

* cited by examiner

US 9,026,813 B2

ESTABLISHING A POWER CHARGING ASSOCIATION ON A POWERLINE NETWORK

CROSS-REFERENCE TO RELATED APPLICATIONS

This application claims priority to U.S. Application Ser. No. 61/416,183, filed on Nov. 22, 2010, incorporated herein by reference.

TECHNICAL FIELD

This description relates to associating communication devices based on detected signal path characteristics.

BACKGROUND

A new communication device (the "client") may be added to a network of multiple devices coupled to a shared communication medium, and it may be desirable to associate the client with another device (the "service agent") coupled to the medium for the purpose of establishing a communication link or conducting some other transaction. Since the medium is shared, the client may be able to communicate with multiple other devices, including multiple service agents. A cellular communication system uses certain techniques to determine the base station (the service agent) with which a mobile device (the client) associates. For example, in some techniques base stations periodically transmit standard signals that can be used by mobile devices to measure the signal characteristics between the mobile device and the base station. When the mobile device is active, it constantly monitors the signal characteristics of signals transmitted from different base stations, including the one with which it is currently associated). If it determines that the signal characteristics of another base station are better, then the mobile device initiates a handoff mechanism to be associated with the other base station. In the case of cellular communication systems, associating with the best or correct base station is not critical to the proper operation of the cellular communication system. Associating with an inferior base station just reduces the quality of the phone call.

SUMMARY

In one aspect, in general, a method includes associating service agents in communication over a network to one or more respective clients coupled to the network at respective ports of the network is described. At a first service agent, a first signal is received from a first client coupled to the network at a first port. The first signal propagates over a first signal propagation path between the first service agent and the first port. An association between the first service agent and the first client is established based at least in part on a difference between: the first signal propagation path between the first service agent and the first port, and a second signal propagation path between the first service agent and a second port or between a second service agent and the first port.

In another aspect, in general, a network comprises: a plurality of service agents in communication over the network; and a plurality of ports of the network configured to couple a client. One or more of the service agents comprise circuitry configured to: receive, at a first service agent, a first signal from a first client coupled to the network at a first port, the first signal propagating over a first signal propagation path between the first service agent and the first port; and establish an association between the first service agent and the first client based at least in part on a difference between: the first signal propagation path between the first service agent and the first port, and a second signal propagation path between the first service agent and a second port or between a second service agent and the first port.

In another aspect, in general, an apparatus comprises: a port configured to couple to a client to a power line segment; first relay circuitry having a high conductivity state and a low conductivity state, configured to provide power from a power line network to the power line segment; second relay circuitry having a high conductivity state and a low conductivity state, configured to couple signals in a first frequency spectrum on a bypass segment of the power line network that connects to the power line segment on both sides of the first relay circuitry; and a communication interface configured to couple to the power line network through the bypass segment.

Among the many advantages of the invention (some of which may be achieved only in some of its various aspects and implementations) are the following. Some embodiments provide a simple and efficient interface for charging of electric devices with automated billing. Some embodiments may help to prevent fraud and billing errors by correctly associating a device attached to a power-line network with the correct power meter.

Other aspects and advantages will be apparent from the detailed description, drawings, and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

This disclosure describes systems and methods by which a client can be associated with the correct service agent. When a client wishes to associate with a service agent, it couples to the medium and transmits one or more broadcast signals on the medium to announce it presence and sound out the propagation paths to candidate service agents in the network. The shared medium may have persistent and characteristic signal propagation qualities between various medium coupling points. By using the signal propagation characteristics for paths between the client and the candidate service agents, the service agents are able to determine which one among them is the correct device to associate with the client, or the client is able to determine which service agent is the correct one with which to associate. Various methods can be used to determine the association. The methods can use various combinations of three sets of techniques to determine the location in the network topology where the client has coupled to the medium and thus which service agent should associate with the client. The first set of techniques exploit knowledge of static characteristics of different paths within the shared communications medium to determine, based upon a set of received signal measurements, where the client has coupled to the shared medium. The second set of techniques dynamically vary path characteristics and search for matching patterns of variation in a sequence of received signal measurements to determine where the client has coupled to the shared medium. The third set of techniques initiate a localized event that can be detected only by a client coupled to a specific segment or area of the shared medium. The client is requested to detect and report the timing of the event in order to confirm the client's location.

The client may also alter the signal it transmits to facilitate selection of the service agent. This may involve reduction of the transmit power level so that only service agents that are in close proximity may hear its signals.

Figure 1A:
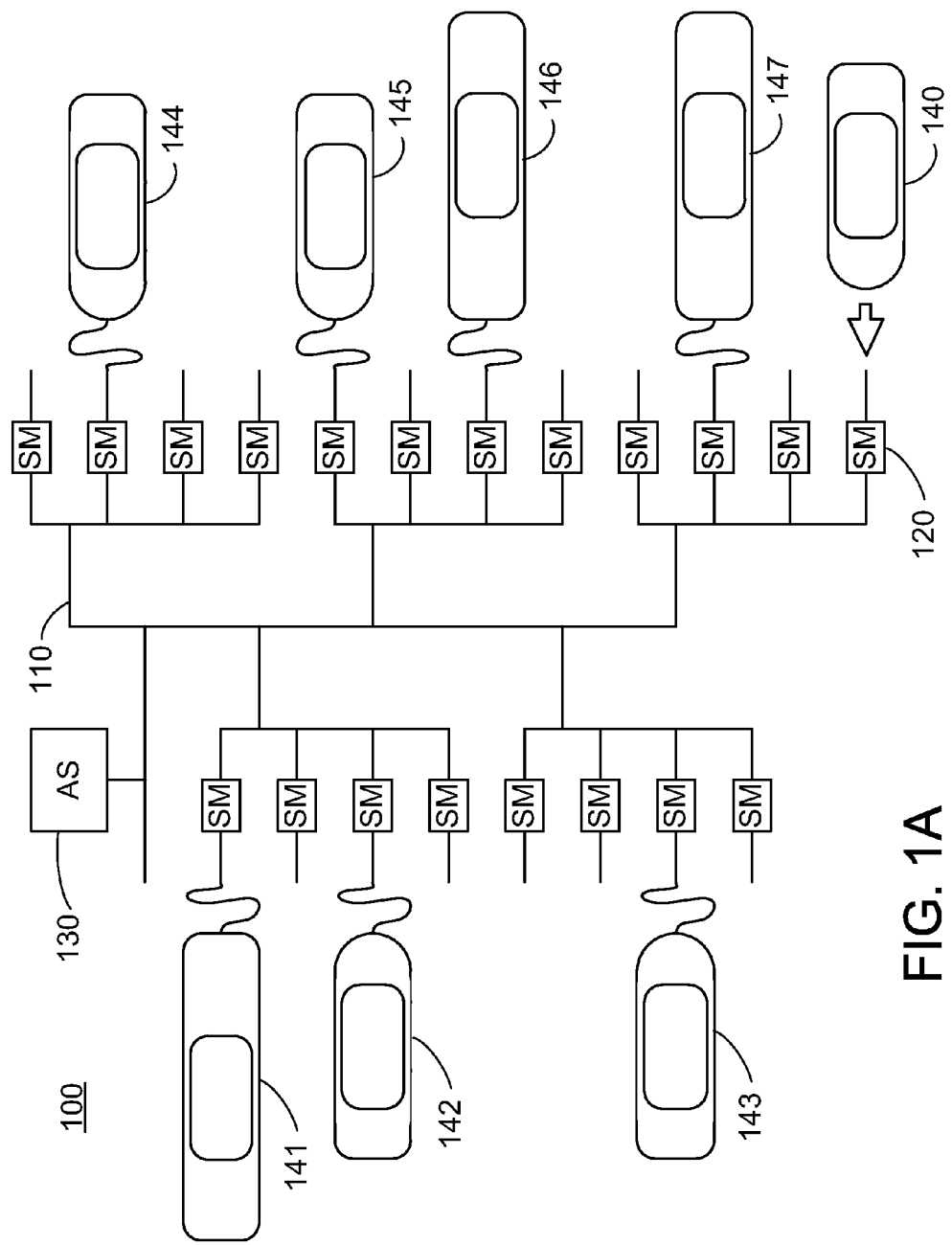
FIG. 1A is a schematic diagram of a charging station servicing power electric vehicles.

One application of these methods is to associate a Power Electric Vehicle (PEV) with the appropriate Smart-Meter (SM) when it connects to a terminal of a SM in a charging station 100 with multiple SMs connected to a shared power line communication medium. FIG. 1A depicts a PEV parking lot charging scenario. The charging station 100 uses the medium 110 that supplies power to the PEVs 140-147 as a power line communication network that is coupled to a power source (not shown), numerous Smart-Meters (SMs) (e.g., SM 120) connected to the shared medium 110, and an authentication server (AS) 130 connected to medium 110 which communicates with the SMs and/or PEVs to facilitate billing transactions. Each SM (e.g., SM 120) is connected to a segment of the medium 110 that terminates at a charging terminal or attachment point, where a PEV (e.g., PEV 140) may couple itself to the shared medium. Each SM includes a Power Line Communication (PLC) device and a power meter that allows it to measure power delivered through its power line segment and report the measured power consumption via PLC messages to facilitate billing transactions. In order to bill the proper party for power consumption, the PEV 140 provides identifying information, such as account information, and that information is associated with the power measurement from the meter on the segment to which the PEV is connected. All this information may be collected and transmitted to the AS 130 through the use of PLC which has the advantages of simplifying the user interface and saving the costs of maintaining a parallel communications infrastructure in addition to the power transmission infrastructure.

In the example of FIG. 1A, the SM 120 that measures the power consumed by a PEV is nearest, in a network topological sense, to the PEV 140 because the SM 120 is connected to the power line segment that terminates at the PEV's 140 attachment point. Thus, the identifying information for the PEV 140 may be associated with the proper power consumption measurement by associating the nearest SM 120 with the PEV 140 for purposes of the charging transaction. When a PEV 140 connects to the charging station, it may transmit PLC messages requesting service and identifying itself. PLC messages from the PEV 140 may be received by multiple SMs in the charging station because they are transmitted on the shared medium 110. The three techniques described above may be used in various combinations to determine which SM is nearest to the PEV. In this scenario, the PEV 140 is acting as a client and the SMs, or more specifically the PLC devices in the SMs, act as service agents.

Figure 1B:
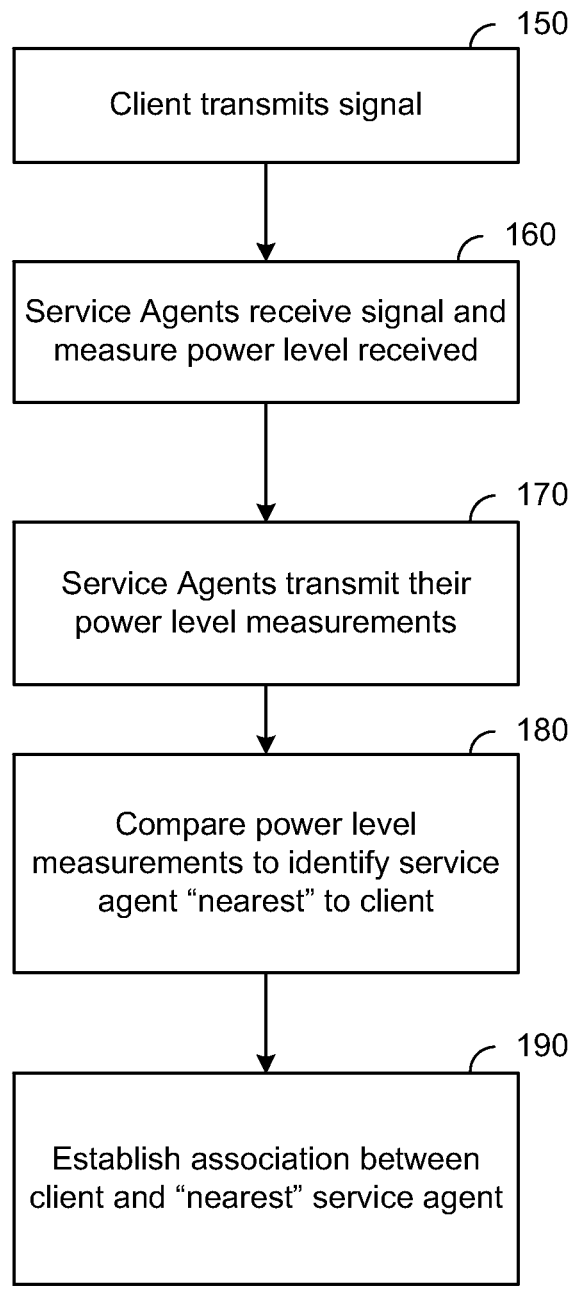
FIG. 1B is a flowchart of an exemplary procedure for associating a client with the correct service agent from a group of service agents.

FIG. 1B is a flow chart of the process for associating a client, e.g. a PEV, with a service agent, e.g. an SM. After coupling to the shared medium, the client transmits 150 one or more signals on the medium. The signal(s) may include a broadcast message that identifies the client and announces its request for service necessitating an association with a service agent. The signals may also include sounding signals that facilitate channel identification techniques. For example wideband signals may be used to efficiently map the frequency response of signal propagation paths on the medium. A broadcast message from the client may describe future transmissions, such as sounding signals, that will be transmitted later and specify properties of those signals, such as the timing and the transmit power level.

Service agents in the network receive 160 the signals transmitted by the client. Service agents in the network may listen for broadcast requests for service. When the service agents receive a signal bearing the request message or a later sounding signal, the service agents measure the received power level of the signal(s). The service agents then share the measurements they collect with each other or with a centralized control server that coordinates the service agents. The measurements are shared by transmitting 170 PLC messages on the medium that bear the measurement themselves or information derived from the measurements such as path attenuations.

When the signal power measurements or information derived from them for each candidate signal propagation path are gathered by a service agent or control server, these path characteristics are compared 180 to each other and/or other a priori information about the known characteristics of paths in the medium. For example, if the transmit signal power used by the client is known, the attenuation of the path between the client and a candidate service agent can be determined from that service agent's measurement of received power level. The attenuations of each of the candidate paths may be compared to choose the minimum attenuation path if that corresponds to the nearest or best service agent for the client. The candidate path attenuations may also be compared to known distinctive attenuations for paths between a service agent and a possible client connection point, with a match indicating the location of the client within the topology of the communications network. Variations in a sequence of measurements by a service agent may be compared to a known sequence of dynamic path attenuation variations induced by the service agent or another device in the communications network. A sequence match may indicate location of the client and the proper association of the client with a service agent.

Once the comparisons are completed and a candidate service agent has been identified as the nearest or correct service agent for the client, an association is established 190 with the client. The association may be established by sending a message from the service agent to the client announcing the association and initiating a requested transaction. In some cases, the service agent may verify the legitimacy of the association by initiating a localized event and asking the client to detect and confirm the timing of that event. For example, in charging station example of FIG. 1A, the SM 120 may close a relay on its power line segment to start the flow of power to the client PEV 140 and note the timing of the event. The SM may also send a message to the PEV client bearing a timestamp for the switching event. When the PEV 140 detects the flow of power, it may compare the timestamp received from the SM to the time at which the PEV detected the start of power flow resulting from the switching event. If the timestamps for the detection of the switching event matches the actual time for the event within a tolerance, the proper association of the service agent with the client is confirmed. If the client never detects the localized event or the timestamps don't match, then the association may be aborted a new request for an association may be initiated by the client.

Any of a variety of communication system architectures can be used to implement the portion of the communication interface that converts data to and from a signal waveform that is transmitted over the communication medium. An application running on a station provides and receives data to and from the network interface module in segments. A "MAC Service Data Unit" (MSDU) is a segment of information received by the MAC layer. The MAC layer can process the received MSDUs and prepares them to generate "MAC protocol data units" (MPDUs). An MPDU is a segment of information including a header (e.g., with management and overhead information) and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line by the physical layer.

Apart from generating MPDUs from MSDUs, the MAC layer can provide several functions including channel access control, providing the required QoS for the MSDUs, retransmission of corrupt information, routing and repeating. Channel access control enables stations to share the power line medium. Several types of channel access control mechanisms like carrier sense multiple access with collision avoidance (CSMA/CA), centralized Time Division Multiple Access (TDMA), distributed TDMA, token based channel access, etc., can be used by the MAC. Similarly, a variety of retransmission mechanism can also be used. The Physical layer (PHY) can also use a variety of techniques to enable reliable and efficient transmission over the transmission medium (power line, coax, twisted pair etc). Various modulation techniques like Orthogonal Frequency Division Multiplexing (OFDM), Wavelet modulations can be used. Forward error correction (FEC) codes, like Viterbi codes, Reed-Solomon codes, concatenated codes, turbo codes, low density parity check code, etc., can be employed by the PHY to overcome errors.

Some implementations of the PHY layer use OFDM modulation. In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

Figure 2:
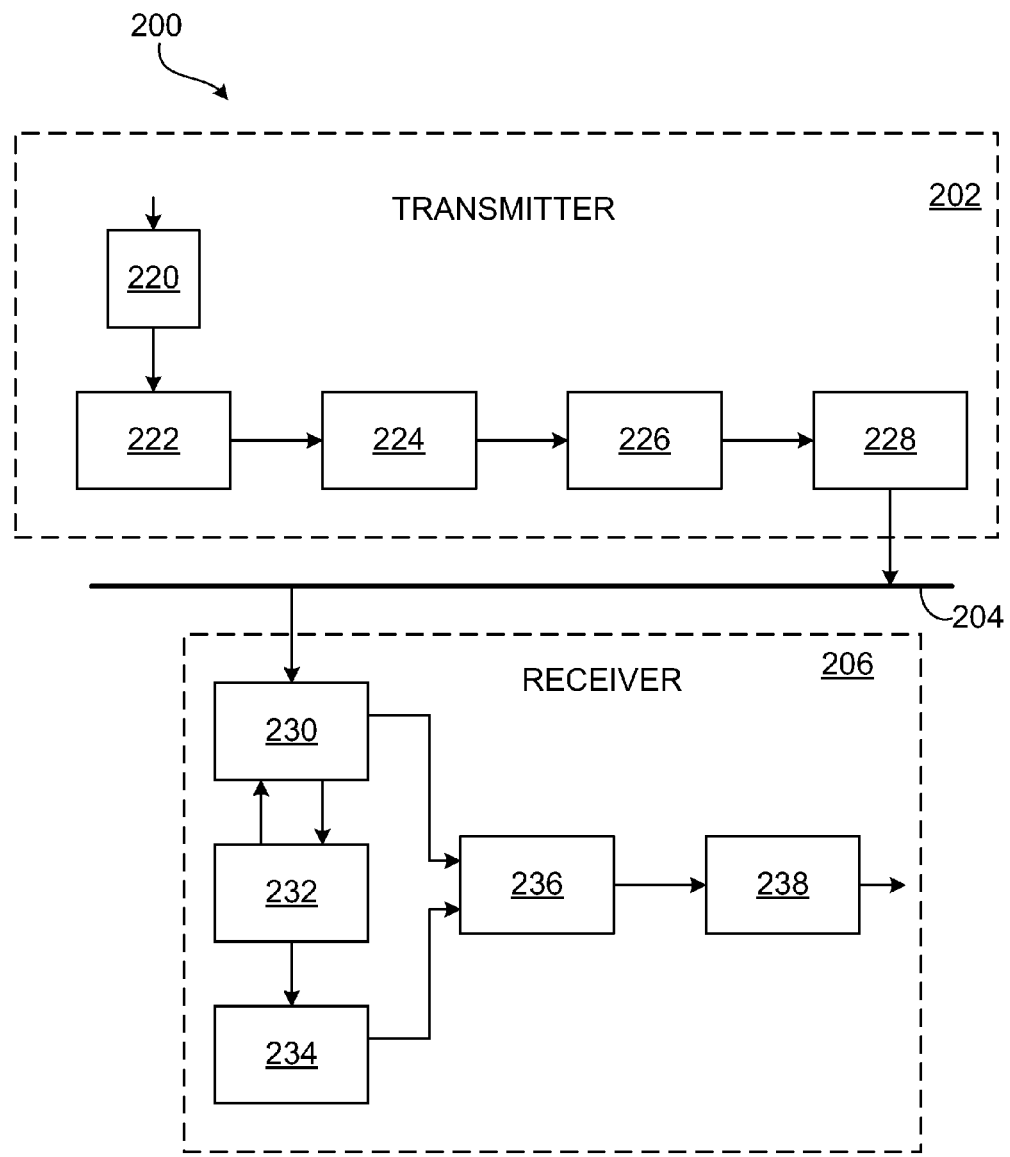
FIG. 2 is a block diagram of a communication system for communicating over the medium.

Referring to FIG. 2, a communication system 200 includes a transmitter 202 for transmitting a signal (e.g., a sequence of OFDM symbols) over a communication medium 204 to a receiver 206. The transmitter 202 and receiver 206 can both be incorporated into a network interface module at each station. The communication medium 204 can represent a path from one device to another over the power line network.

At the transmitter 202, modules implementing the PHY layer receive an MPDU from the MAC layer. The MPDU is sent to an encoder module 220 to perform processing such as scrambling, error correction coding and interleaving.

The encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i=A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 222 also determines which of the carrier frequencies $f_1, \ldots, f_N$ within the OFDM bandwidth are used by the system 200 to transmit information. For example, some carriers that are experiencing fades can be avoided, and no information is transmitted on those carriers. Instead, the mapping module 222 uses coherent BPSK modulated with a binary value from the Pseudo Noise (PN) sequence for that carrier. For some carriers (e.g., a carrier i=10) that correspond to restricted bands (e.g., an amateur radio band) on a medium 204 that may radiate power no energy is transmitted on those carriers (e.g., $A_{10}=0$). The mapping module 222 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 224 performs the modulation of the resulting set of N complex numbers (some of which may be zero for unused carriers) determined by the mapping module 222 onto N orthogonal carrier waveforms having peak frequencies $f_1, \ldots, f_N$. The modulated carriers are combined by IDFT module 224 to form a discrete time symbol waveform S(n) (for a sampling rate $f_R$), which can be written as $$S(n) = \sum_{i=1}^{N} A_i \exp[j(2\pi i n/N + \Phi_i)] \qquad \text{Eq. (1)}$$

where the time index n goes from 1 to N, $A_i$ is the amplitude and $\phi_i$ is the phase of the carrier with peak frequency $f=(i/N)f_R$, and $j=\sqrt{-1}$. In some implementations, the inverse discrete Fourier transform corresponds to an inverse fast Fourier transform (IFFT) in which N is a power of 2.

A post-processing module 226 combines a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. The effect of the transmission of the continuous-time version of the waveform S(t) over the communication medium 204 can be represented by convolution with a function $g(\tau, t)$ representing an impulse response of transmission over the communication medium. The communication medium 204 may add noise n(t), which may be random noise and/or narrowband noise emitted by a jammer.

At the receiver 206, modules implementing the PHY layer receive a signal from the communication medium 204 and generate an MPDU for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). In some implementations, the discrete Fourier transform corresponds to a fast Fourier transform (FFT) in which N is a power of 2.

Demodulator/Decoder module 238 maps the complex numbers onto the corresponding bit sequences and performs the appropriate decoding of the bits (including de-interleaving and descrambling).

Any of the modules of the communication system 200 including modules in the transmitter 202 or receiver 206 can be implemented in hardware, software, or a combination of hardware and software.

In some embodiments, clients and service agents conducting association processes described below may use a robust OFDM signaling method. A robust OFDM signaling method uses a default tone map with a high level redundancy in the channel coding scheme to reliably send information at low data rates without a need to map each point-to-point channel within the network. After the association is completed, a client and its associated service agent may transmit training sequences to map the point-to-point channels in each direction and optimize the data rate for communications between the associated devices. An example of such a robust OFDM signaling method is described in more detail in U.S. Pat. No. 6,278,685, incorporated herein by reference.

One type of technique that may be used to determine the correct or best association is based on knowledge of static path characteristics of signal propagation paths within the communication network. The shared communication medium may remain unchanged during the period in which association is determined, but may have signal propagation qualities varying between each pair of attachment points. This variation allows a client to determine its location or service agents to determine a client's location in the network. The signal propagation qualities may be a consequence of the medium and the topology used, such as attenuation, or particular characteristics may be deliberately induced in topology segments, such as additional attenuation or frequency-dependent attenuation. Service agents may be programmed or trained with the signal characteristics from specific attachment points, so that they are able to recognize a client's attachment point based on the characterization of the channel between the client and the service agent. This decision may be based on the channel characterization between client and service agent alone (absolute characterization), or it may include information on characteristics of channels between the client and other service agents as well (relative characterization).

The wired topology is designed such that there is a known and significant attenuation between segments connecting the service agents to each other and to remote client attachment points, and known and low attenuation on the segment(s) that connect a service agent to its local client attachment point(s).

If the client's transmission signal power is known reliably, the service agent can determine whether or not the signal originated at one of its local client attachment points by using the following information The attenuation between a service agent and the possible attachment points for any remote client attachment point is reliably and distinguishably higher than the attenuation between the service agent and any of its local client attachment points The service agent can determine from the received signal power the amount of attenuation suffered by the signal along the path If the client's transmission signal power is not known reliably, then the service agents can exchange received signal power information with each other to determine the service agent with the best signal power, hence the service agent that is closest to the client.

Instead of broadband attenuation on path segments, specific filters may be introduced that change the signal uniquely along each path. For example, notch filters may be introduced that selectively attenuate a small frequency range, and the notched bands may be different for different segments. If there is no notch filter on the segments between a service agent and its local client attachment points and always one or more notch filters between a service agent and any remote client attachment point, then the service agent can determine from the presence or absence of notches in the received signal which notch filtered segments lie between a client and itself. Using this information, the service agent can decide whether it is the correct one to associate with the client.

A second type of technique that may be used to determine the correct or best association is based on controlling the variation of dynamic path characteristics of signal propagation paths within the communication network. The service agents may be able to alter the signal propagation characteristics of the medium. This may involve specific segments of a wired medium, and the service agent may be able to change overall attenuation or frequency-dependent attenuation on a segment. The segment may be between the service agent and the client, or may be between the portion of the medium to which both the service agent and the client are attached and the portion of the medium to which the other service agents and clients are attached.

Each service agent may be able to alter the signal propagation characteristics along one or more segments in the medium. In this case, the service agent may measure channel characteristics between it and the client during the various segment states over which it has control to determine whether or not the client is local.

In one scenario, the service agent is able to change the attenuation between a local client attachment point and itself significantly, while leaving the attenuation between remote client attachment points and itself with insignificant changes. Here, the service agent may toggle the medium segment attenuation and measure the effects on the signal from the client. If the signal attenuation changes significantly in synchronization with the changes the service agent makes in the medium segment it controls, then the client is determined to be local, otherwise the client is determined to be remote. However, another service agent that happens to toggle its medium segment attenuation in synchronization with the first agent may cause both of them to conclude that the client is local. Hence the toggling sequence should be both random and sufficiently long to make this situation unlikely, or the service agents should each use an assigned toggling sequences from a set of toggling sequences with low cross correlations.

In another scenario, the service agent is able to change the attenuation significantly between a local client attachment point and other service agents without significantly changing the attenuation between itself and the local client attachment point. By toggling the medium segment attenuation and measuring the effects on the signal from the client, the service agent can determine whether or not the client is local. If the received signal does not change significantly when the medium segment is attenuated, then the client is local, otherwise it is remote. In this scenario, the chance actions of another service agent cannot cause a service agent to mistake a remote client for a local one.

A third type of technique that may be used to determine the correct or best association is based on initiation and timing of an event that is localized and detected by clients at a particular location within the communication network. If there are out-of-band local events that can be caused by the service agent and detected by the local client, then the two may use these events to determine or to confirm their association. The event is local in the sense that only a local client can detect the event. In one approach, the client and service agent share a common time base, and a timestamp is taken by each when the service agent causes the external event to occur. The client provides its timestamp to the agent in order for the agent to decide if the client is local or not. Some amount of variability in the timestamp taken by the client and the timestamp taken by the service agent can be expected, and will depend on the nature of the event and the mechanisms used to detect the event by the client. If the timestamps agree within the given tolerance, then the client is deemed to be local.

Another approach does not require a common time base, but requires the service agent to cause a timed sequence of events. When the sequence is over, the client provides the service agent with the sequence of durations of the intervals between events in the sequence. If the client's sequence of durations matches that of the service agent, within tolerances as above, then the client is deemed to be local.

Referring back to FIG. 1A, an exemplary embodiment uses one or more of the techniques to associate a client PEV (e.g. 140) with an SM (e.g. 120) in a parking lot charging station 100. Electrical vehicles need to be able to recharge at locations other than the home of the vehicle owner. Since recharging typically takes hours, recharging stations can be expected to be in parking lots. In these foreign locations, the driver whose vehicle receives the energy must pay for it. Hence, each individual charging station can have its own power meter that measures the amount of energy provided to the vehicle it is recharging. In order to make these stations cost effective and user friendly, it is helpful to keep the complexity of the electromechanical systems low, and the user interface simple.

The simplest user interface is for the user just to plug the vehicle into a charging station and have the vehicle, the charging station, and some other system elements handle all the rest. This implies that the vehicle provides account information and authenticates for payment purposes, and that the SM that is charging the vehicle reports the energy delivered and possibly other information such as start and end times of the charging period, etc. The requirement of a user performing no action other than plugging in the vehicle leads to a challenge for SMs and vehicles using power line communication (PLC) to communicate with each other to accurately determine which SM is providing power to which vehicle.

FIG. 1A shows a parking lot PEV charging station with multiple SMs. The PLC signal from a PEV will be received by multiple SMs. The SMs that are a longer distance from the SM to which the PEV is attached are likely to see larger signal attenuation. However, the differences in attenuation based on distance to the PEV alone may not be sufficient to reliably determine which SM is providing energy to a PEV. There may be hundreds of SMs in the SM network.

The SM (e.g. 120) controls two relays. One is the power relay, which acts as an electronically controlled switch to provide or withhold power from a PEV attached to the SM's power line segment. The other relay is in a bypass circuit with high-pass filter that allows the PLC unit in the SM to communicate with devices on both sides of the power relay, regardless of the power relay state. The relay in the bypass circuit introduces a significant attenuation in the PLC signal power when it is open, for example, a 20 dB average loss over all frequencies.

The PEV can synchronize with the time base used by an SM and determine timestamps consistent with the SM to which it is attached. As a particular example, both the SM and the PEV can determine the time according to the network time base when power is turned on (i.e., the high power relays are closed), and this time will agree within at most a few milliseconds.

In some cases, the PEV may be assumed to be configured for the country in which it is charging so that the PLC transmit signal power is known, along with the range of attenuations typically experienced between the PEV and its SM. Even if the PEV transmit signal power is not known a priori by the SM, the PEV may communicate this to the SM during initial negotiations.

Figure 3:
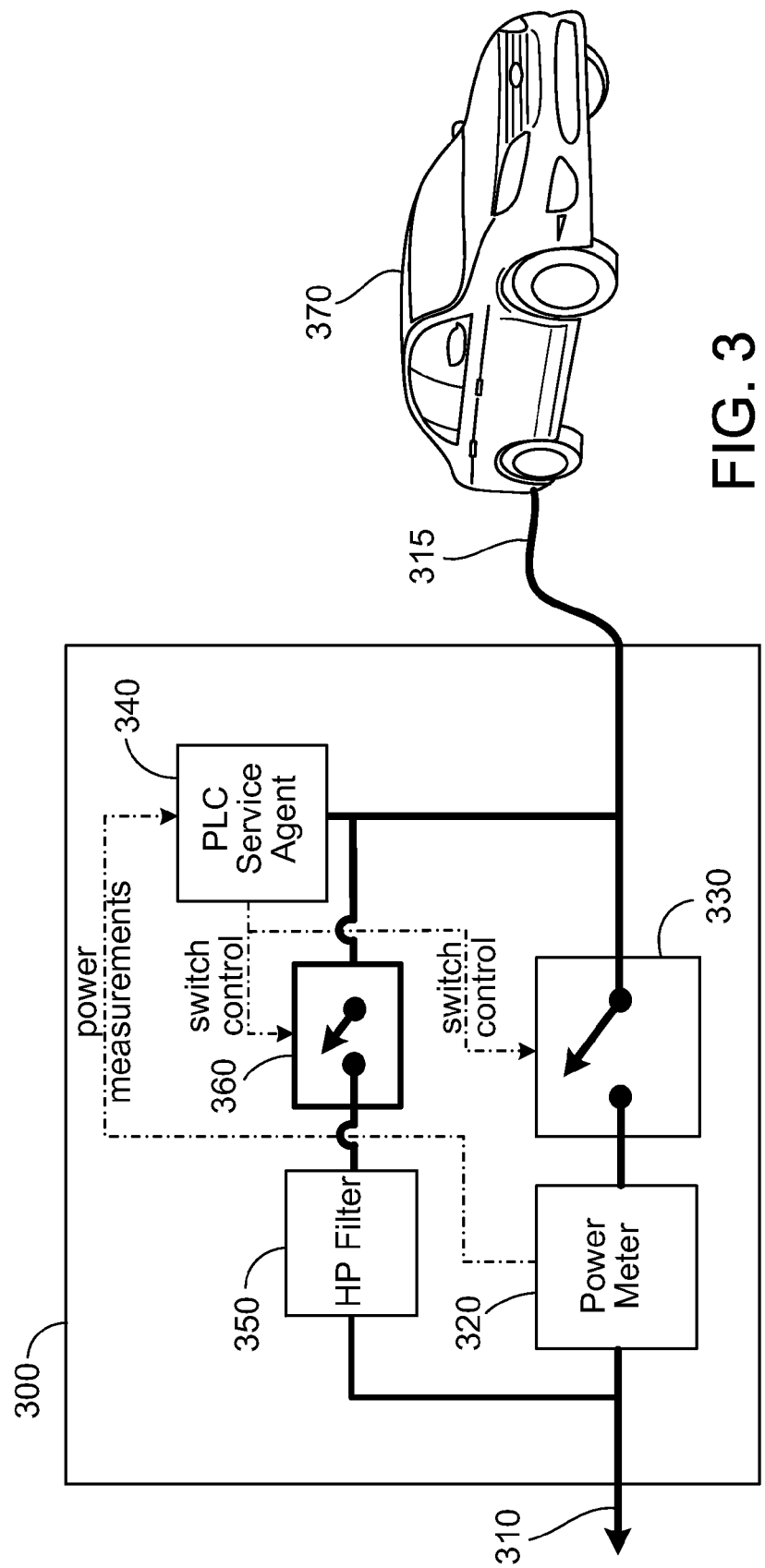
FIG. 3 is a schematic diagram of a smart meter with a proximal configuration for its power line communication service agent.

FIG. 3 depicts an exemplary Smart Meter (SM) 300. The SM 300 is connected to a segment of a power line 310 that terminates at an attachment point 315 or charging terminal. The attachment point 315 may include a cable that is used interface with a PEV 370. The SM 300 includes a power meter 320, a high power relay 330 to cut power on and off to the PEV, a PLC service agent 340 attached to a bypass circuit around the high power relays that has a high-pass filter 350, and a relay 360 in the bypass circuit (the PLC relay) that increases attenuation for the PLC signal substantially when open while still allowing PLC signals to be received across the open relay. For example, the bypass relay 360 may introduce about 15 dB of additional path attenuation when in the open state. The default state of the high power relay 330 is open (no power), and the default state of the PLC relay 360 is closed (best PLC signal propagation). The high-pass filter may include a series capacitor.

The SM 300 may be connected to a PLC network consisting of other SMs and a network time base is provided to all the SMs and to any PEV connected to the network. The PLC service agent 340 is a PLC device that is capable communicating with other PLC devices coupled to the shared power line medium 310 such as other SMs, an AS 130, or a PEV connected to the power line at its attachment point 115 or at some other attachment point in the PLC network. The PLC service agent 340 also reads power consumption information from the power meter 320 and controls the states of the high power relay 330 and the bypass relay 360. The PLC service agent 340 is capable of synchronizing its clock to the network time base. In the PEV 370, there is a PLC device capable of communicating with the local SM 300 or other PLC devices in the PLC network and synchronizing its clock to the network time base. PLC devices in the PLC network may synchronize their clock to the network time base by receiving control signals broadcast on the medium periodically (e.g. every 20 or 33 milliseconds) by a master station on the PLC network which include network time base information. Examples of techniques for synchronizing signals in a PLC network are described in U.S. Pat. No. 7,729,372, incorporated herein by reference.

In the example of FIG. 3, the PLC service agent 340 is proximal to the attachment point 315 and there are no relays in the power line 310 between the attachment point 115 and the point at which the PLC service agent 340 couples to the power line. As a result there is little attenuation on the signal propagation path between a PEV 370 connected to the attachment point 115 and the PLC service agent 340 and, when the high power relay 330 is open, changes in the state of the bypass relay 360 substantially change the attenuation characteristic of paths between the PLC service agent and remote PEVs well leaving the attenuation characteristic of the path to the local PEV 370 unchanged.

Figure 4:
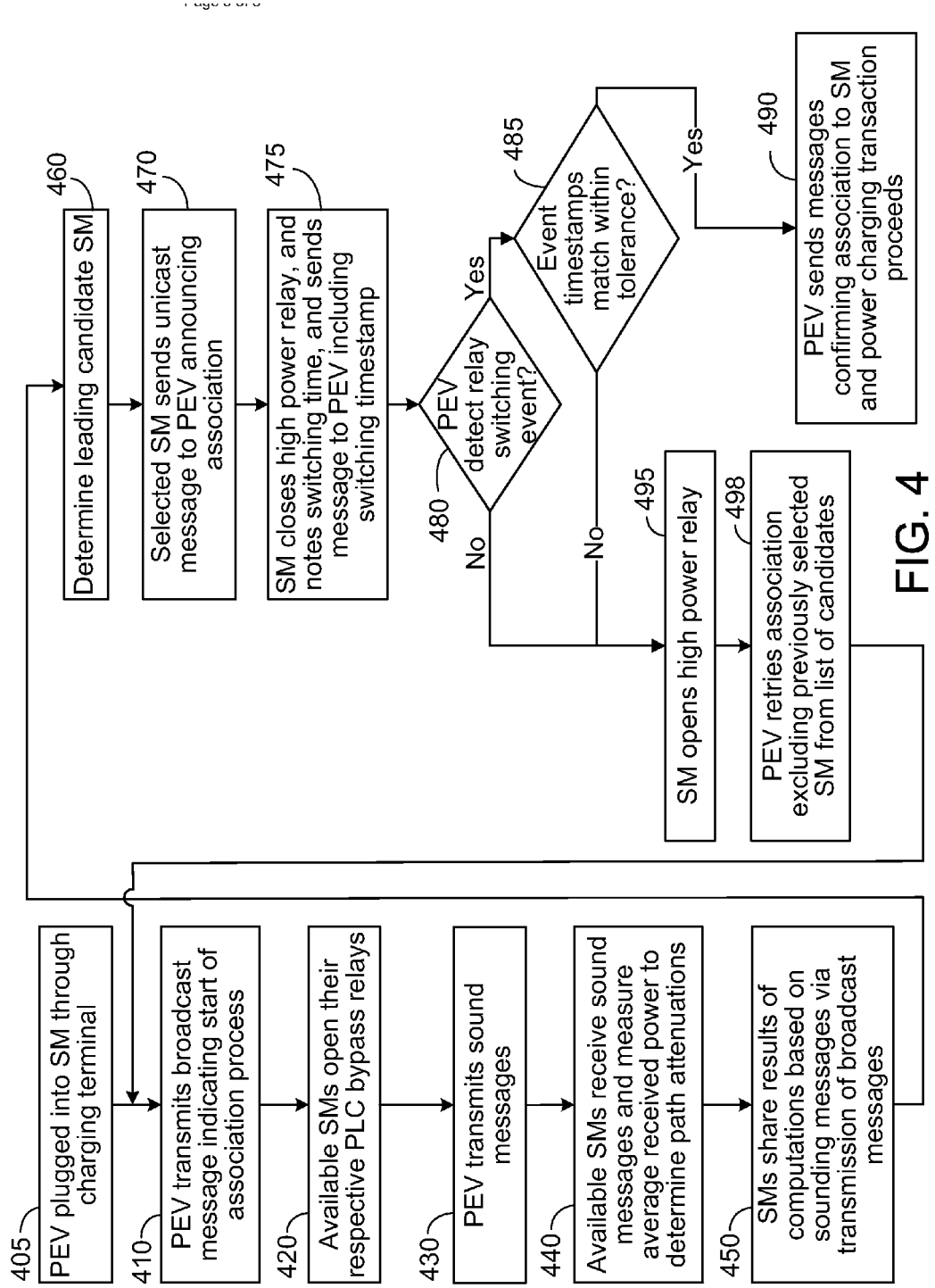
FIG. 4 is a flowchart of a protocol for associating a client power electric vehicle with a smart meter with its service agent in a proximal configuration.

The proximal configuration for the SM of FIG. 3 supports the example protocol depicted in the flow chart of FIG. 4. The association process begins when the PEV 370 is plugged 405 in to the charging terminal or attachment point 315 of the SM 300, connecting it to the electrical wiring that forms the shared power line medium 310 for a PLC network, such as charging station 100, with multiple SMs. The PEV issues a broadcast 410 message, which it may repeat 2-3 times for reliability, indicating that it is starting the matching process with open PLC relays. This message includes the following information: a maximum attenuation level (in dB) allowable for an SM to respond later, and the number of sound messages it will send.

Upon receipt of the message indicating the start of the matching process with open PLC bypass relays, any SM that is not already associated with a PEV shall open 420 its PLC bypass relay (e.g. 360) and await one or more sound messages from the PEV 370.

The PEV 370 will broadcast the indicated number of sound messages 430, and the SMs engaged in matching will receive the sound messages 440, processing them to determine the average attenuation from the known source signal levels, which may be frequency-dependent). Once the PEV 370 has sent the last scheduled sound message, it shall broadcast a message indicating that it has finished sending sound messages for the open PLC relay configuration and is inviting SMs to respond. Any SM whose attenuation levels computed from the sound messages meet the criterion provided in the earlier messages sent by the PEV 370 shall then send by broadcast 450 a message to all other SMs providing the results of its computations based on the sound messages. Each SM shall delay the broadcast of this message by a random amount of time that depends on the average attenuation it measures. The greater the attenuation, the longer the delay. If a lower average attenuation is reported by another SM, then the SM suppresses its report.

The SMs, including SM 300 shall collect responses, if any, for a certain amount of time and determine 460 the SM with the lowest attenuation as the leading candidate SM. The SM which determines that it has the lowest average attenuation shall issue a message indicating that it won, and wait time for another SM that has lower average attenuation to contradict it. If another SM exists with a lower attenuation than the SM which is currently the leading candidate, it sends a unicast message contradicting the earlier claimant in addition to the broadcast message.

The top candidate SM 300 shall send 470 the PEV 370 a unicast message indicating that it has been selected, and will begin to provide power to the PEV. The SM 300 shall then close 475 the high-power relay 330 and note the time this was done. It shall monitor power consumption to determine whether or not it is supplying power to an attached device. If it is supplying power to an attached device, it shall send a message to the PEV 370 containing the timestamp of when power was turned on. It shall also start a timer.

If 480 the PEV 370 detects that power is being supplied, it notes the time that it started and waits for the message from the SM 300. When it has both its local timestamp for power switch-on and the message from the SM 300, it compares the two timestamps. If 485 they are sufficiently close, then it sends a confirmation message to the SM 300 and the power charging transaction proceeds to completion 490. If the SM 300 does not receive the confirmation message from the PEV 370 before its timer expires, then it opens 495 the high-power relay 330 and notes the failure, including the PEV's identity. In the case of failure, it is up to the PEV 370 to retry 498, noting the identity of the SM(s) that did not provide it power on its earlier attempt(s). The PEV 370 may exclude these SMs from consideration on subsequent attempts.

The exclusion of SMs from consideration during the association protocol may be accomplished in a number of ways. For example, the PEV 370 may include an exclusion list in the broadcast message that announces the PEV's request to restart the matching process. The exclusion list may consist of addresses or other identifiers for the SMs that will be excluded. In another embodiment, the SMs in the network may independently track the state of failed association attempts and refrain from participating in a matching process with a PEV it recently failed to associate with. In yet another example, a coordinating master station may maintain a state recording failed association attempts for all SMs in the PLC network. This may be more efficient in an embodiment where the master station coordinates the matching process.

Alternately, instead of each SM sending/collecting responses to/from every other SM, they may choose to send it to a PLC device which acts as a Coordinating Unit. This unit processes all the messages received from all of the SMs and determine the top candidate SM. The Coordinating Unit may then notify the PEV 370 about the SM to which it is associated.

There may be instances when the simplest criterion for selecting the SM is not sufficient. In this case, a three-stage matching procedure may be followed. In the first stage, the PEV 370 indicates that it is starting a sound message period with PLC bypass relays closed. This allows each SMs to obtain average signal levels when communication is at its best. After the last sound message during this period, the PEV 370 continues with a sound message period with PLC bypass relays open, as before. When this period is done, the PEV solicits bids from the SMs meeting its criteria, which can now include both a maximum attenuation level as before, and a maximum difference in the average attenuation levels observed in the two sound message periods. Since the sound messages will have to travel through two open PLC relays during the second sound message period, the attenuation difference for SMs other than the matching SM should be at least 30 dB, while the signal to the matching SM will have to traverse no PLC bypass relays, and the signal levels should be about the same. This differential approach should yield better differentiation, regardless of the quality of the connection between the PEV 370 and the matching SM 300.

Another example of localized event that may be used to verify associations in a charging station is the coupling of new PEV to the network at an attachment point or port. The attachment point may be on a charging harness that includes a wire called the pilot line. The pilot line connects to the local service agent device but not to the shared medium. The pilot line is used to detect a voltage drop over a load in a connected PEV when the PEV is plugged in at the attachment point. Both the PEV and the local PLC service agent are able to detect the plug-in event by sensing voltage on the pilot line. The local service agent may record a timestamp of the event in the PLC network time base. The PEV may start a timer at the plug-in event. Once the PEV later synchronizes with the network time base, the PEV may subtract the timer value to determine the time of the plug-in event in the shared network time base. The timestamps for the plug-in event recorded by the service agent and the PEV may be compared to verify an association if they match within some tolerance.

Figure 5:
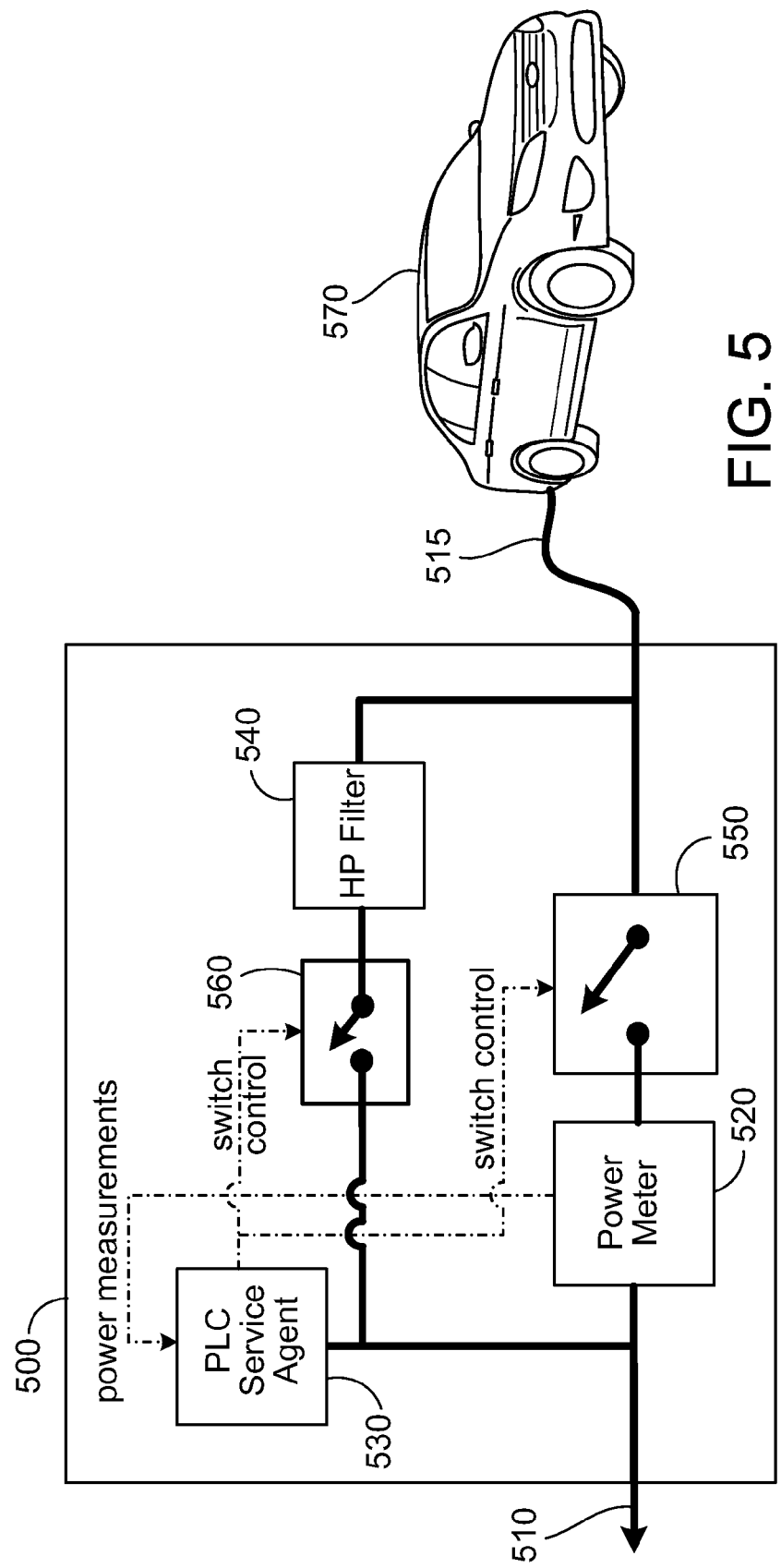
FIG. 5 is a schematic diagram of a smart meter with a distal configuration for its power line communication service agent.

Another embodiment of the SM is depicted in FIG. 5. In this example, the PLC service agent 530 is distal to the attachment point 515 and there is a PLC bypass relay 560 and a high-pass filter 540 in the power line between the attachment point 515 and the point at which the PLC service agent 530 couples to the power line 510. In this case, the PLC service agent 530 controls gross characteristics of the path between it and the PEV 570. By manipulating the attenuation of the channel between the PEV and the PLC service agent, the PLC service agent can determine whether or not it is the SM connected to the PEV 570. The most efficient way for this to be done is for each SM to open and close its PLC bypass relay according to the bits in its binary address. The participating SMs may be synchronized so that each one is in a state corresponding to the same bit of its address. For convenience of numbering, and for maximum reliability, the order of bits will start with the least significant bit (LSB). In this way, the SMs with close addresses, which may be located near one another in the network topology, will quickly distinguish themselves from each other while the timing is most reliable.

Figure 6:
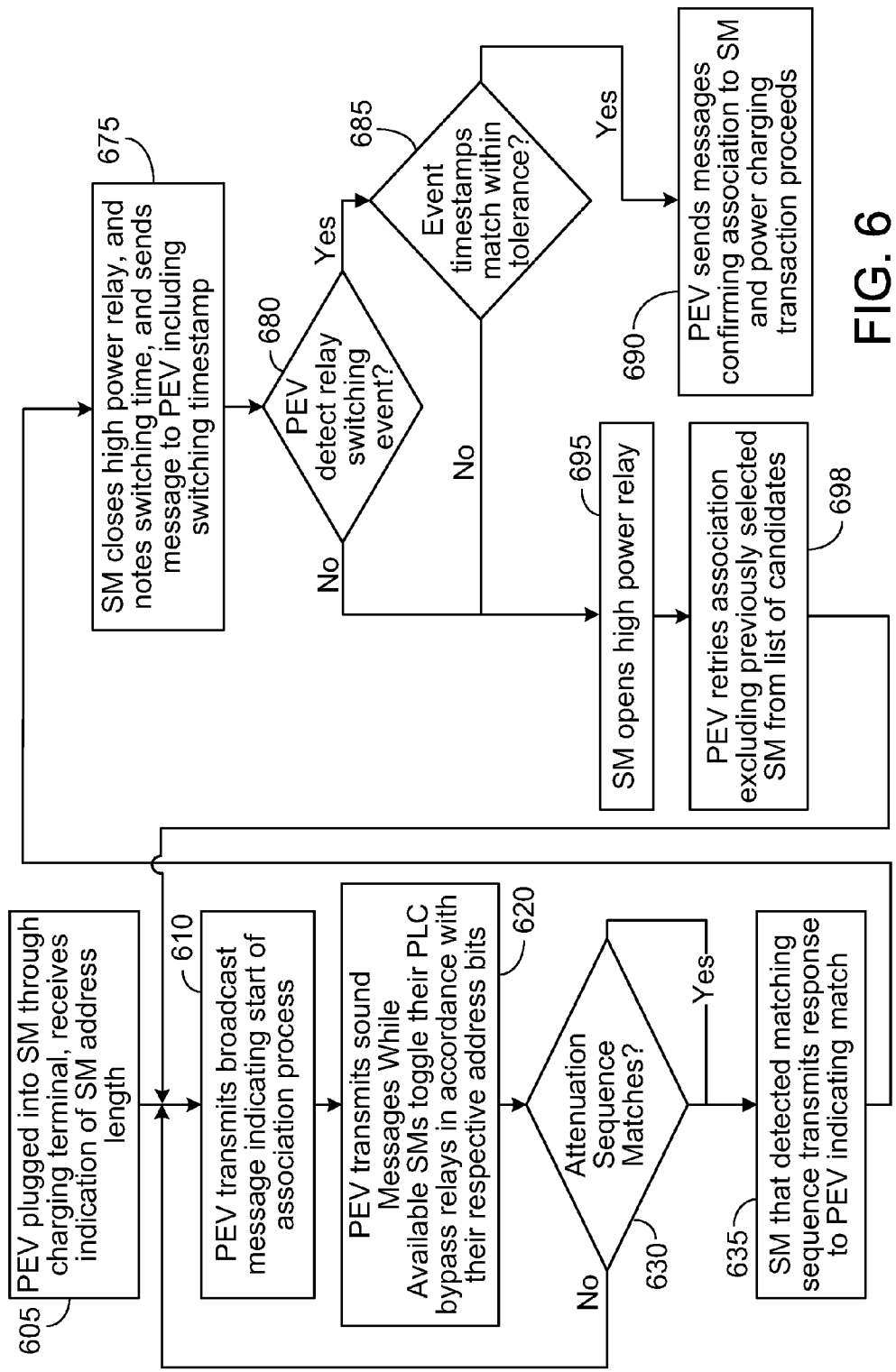
FIG. 6 is a flowchart of a protocol for associating a client power electric vehicle with a smart meter with its service agent in a distal configuration.

The distal configuration for the SM of FIG. 5 supports the example protocol depicted in the flow chart of FIG. 6. The association process begins when the PEV 570 is plugged 605 in to the charging terminal or attachment point 515 of the SM 500, connecting it to the electrical wiring that forms the shared power line medium 510 for a PLC network, such as charging station 100, with multiple SMs. It receives an indication of the length of the addresses of the SMs in the charging station. The PEV 570 issues a broadcast 610 message, which it may repeat 2-3 times for reliability, that it is starting the matching process, including the number of sound messages it will send. The number of sounding messages is preferably at least as great as the number of bits in the SM addresses.

Upon receipt of the start matching process message, any SM that is not already matched shall place 620 its PLC bypass relay in the open state if the LSB of its address is a 0, or in the closed state if the LSB of its address is a 1, and await a sound messages from the PEV 570. The PEV will broadcast the indicated number of sound messages, and the SMs engaged in matching will receive the sound messages, processing them to determine the average signal attenuation. Each sound message will contain a counter indicating which address bit is being considered. As each sound message is received, the SM 500 will determine whether the attenuation corresponds to its PLC bypass relay 560 state (i.e., high attenuation if the PLC relay is open, low attenuation if it is closed). If it does it will set its PLC bypass relay 560 in a state corresponding to the next bit in its address; otherwise it will close its PLC bypass relay and stop participating in the matching process. Once the PEV 570 has sent the last scheduled sound message, it shall broadcast a message indicating that it has finished sending sound messages for the matching process and is inviting SMs to respond.

Any SM whose sequence of attenuation levels computed from the sound messages exactly matched 630 its sequence of PLC bypass relay states shall respond 635 to the PEV 570. This will be a candidate SM. If no SM responds, then the PEV 570 shall start over.

Each candidate SM 500 will begin to provide power to the PEV 570 after its response by closing 675 the high-power relays (e.g. 550) and noting the time this was done. It shall monitor power consumption information from the power meter 520 to determine whether or not it is supplying power to an attached device. If it is supplying power to an attached device, it shall send a message to the PEV 570 containing the timestamp of when power was turned on. It shall also start a timer.

If 680 the PEV 570 detects that power is being supplied, it notes the time that it started and waits for the message from the SM 500. When it has both its local timestamp for power switch-on and the message from the SM 500, it compares the two timestamps. If 685 they are sufficiently close, then it sends a confirmation 690 message to the SM 500 and the power charging transaction proceeds. If the SM 500 does not receive the confirmation message from the PEV 570 before its timer expires, then it opens 695 the high-power relay and notes the failure, including the PEV's identity.

In the case of failure, it is up to the PEV 570 to retry 698, noting the identity of the SM(s) that did not provide it power on its earlier attempt(s). The PEV may exclude these SMs from consideration on subsequent attempts.

When PEV association is accomplished using dynamic path characterization, there is a possibility of collisions if two PEVs attempt to initiate the matching process at the same or nearly the same time. For example, there is a possibility that two PEVs are executing this procedure and one PEV wants to make measurements with a particular PLC bypass relay open while another PEV needs the same PLC bypass relay closed. This may create conflicts and compromise the success of PEV association procedure.

Some embodiments prevent collisions by ensuring that PEV and SMs are synchronized with regards to the state of the PLC bypass relays. So long as all PEVs that are trying to associate and all SMs have the same state, there will not be any problem. A few example methods for synchronization are described below.

In one example, only one PEV is allowed to carry the association procedure at any time. In this approach a master node (e.g., the coordinating master station of the network or Authorization Server) can decide which PEV will do the association procedure at any given time. The PEV that is granted the right to execute the association procedure will indicate to SM's whether it wants the switch to be open or close. If two PEVs arrive at a parking lot and couple to the network at the same time, the master will allow one of them to complete the association first and then let the second PEV execute its association procedure.

In another example, the PEVs that want to execute the association procedure coordinate among themselves and decide the order in which they will associate. For example, PEVs may exchange messages decide if there are other PEVs executing the association process, and if so, add themselves to a queue by claiming a later timeslot through a broadcast control signal. PEVs may use information such as time of arrival and the PEVs MAC addresses etc., to decide the order of association.

In another example, the SMs periodically open or close switches whenever there are PEVs trying to associate. The time at which the SMs open and close the switches will be published (using management message or in Beacons), so that each PEV can decide when to send sounding signals. For example, SMs may be preconfigured to open their PLC bypass relay during odd Beacon Periods and close the relay in even Beacon Periods. Beacons can indicate the Beacon Period Counter and SMs can process this to determine when their PLC bypass relay should be open or closed.

Another embodiment uses static filters to give different signal propagation paths with in the communications network distinguishing characteristics, such as distinctive frequency responses. For example, referring back to FIG. 1A, the charging station network 100 may contain filters on multiple segments of the power line 110. In particular, there may be notch filters in each SM placed between the PLC service agent and the medium 110 to which the rest of the SMs are attached, so that the path from the PEV (e.g. 108) to the local PLC service agent does not contain this notch. When the PEV 108 starts the matching process, the SM 120 simply determines whether or not this notch is present. If there is no notch at the notched frequency, then the SM concludes that it is matched to the PEV.

If the possibility of having a notch at that particular frequency on the path between the PEV and the SM due to power line characteristics is too high, then there are several ways to address this problem. One example is for the SM to have a programmable notch filter, and change the notch over multiple sound messages to determine if a notch in the received signal matches the changes it made. If so, then the SM concludes that it is not the matching SM for that PEV. A static way to solve the problem is for there to be different notch filters at each SM so each SM can detect two notches from PEVs that do not match. If fact, the other SMs can possibly assist an SM in determining that it is the matching SM by using the notches they observe to derive candidate SMs for a given PEV, and announcing the candidate list they have derived. Short lists may be transmitted soonest, with a delay increasing for longer lists. In some embodiments, a coordinating master station on the PLC network stores the parameters of the notch filters employed by all SMs in the network. In another example each SM in the network may determine the notch filter parameters for other SMs in the network through the exchange of control signaling.

A further mechanism to assist distinguishing the matching SM is for there to be a distinct notch filter between the PEV and the PLC service agent, so that a PEV attached to a particular SM will always have that notch present. If it is absent, then the SM can eliminate itself from consideration as the matching SM.

In another embodiment, there may be multiple clients that are serviced by the same service agent. In this case, the service agent either has static distinguishable characteristics between it and each potential client, or it is able to dynamically and selectively alter the characteristics for each client.

Figure 7:
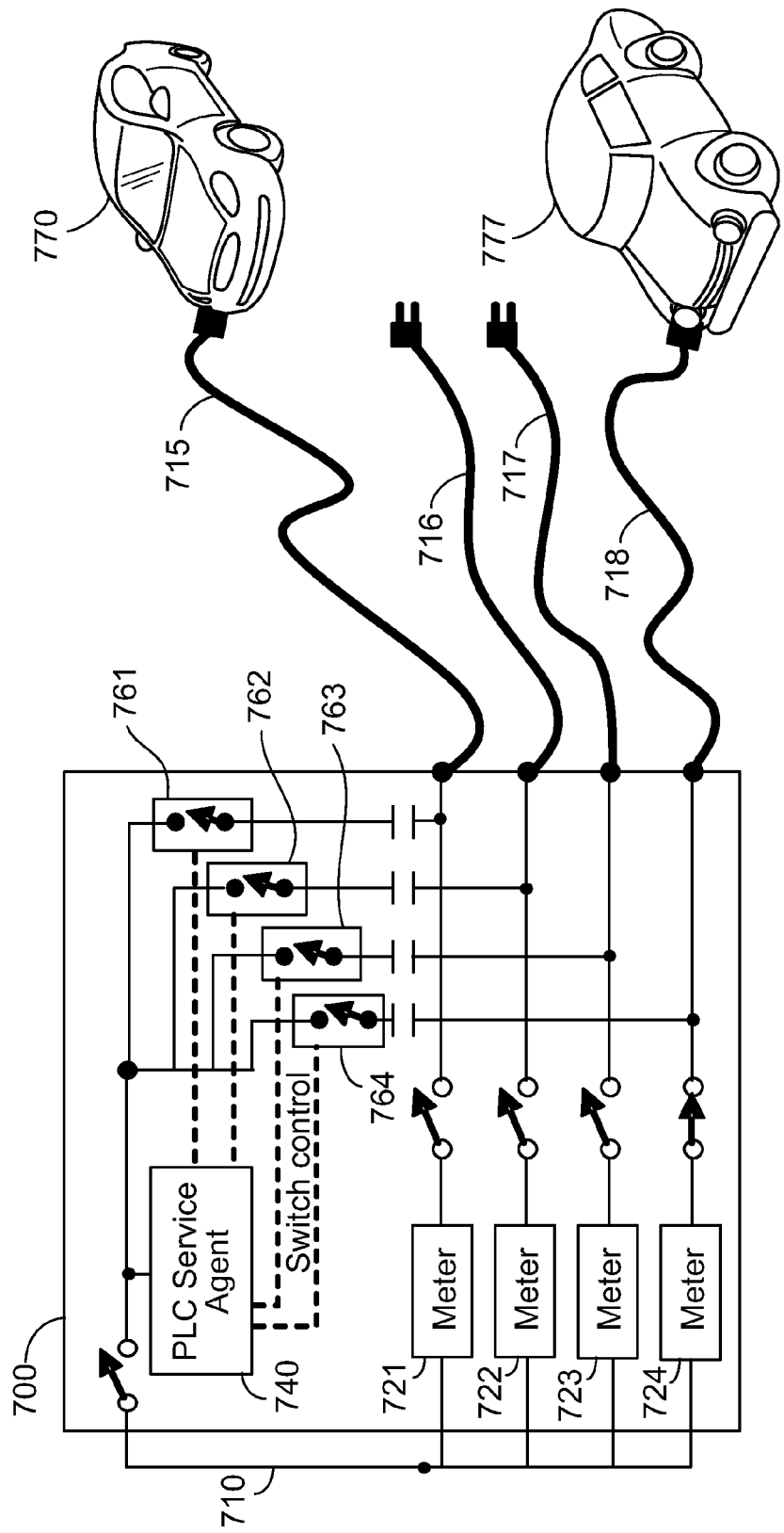
FIG. 7 is a schematic diagram of a charging pedestal with a single power line communication service agent controlling multiple power meters, each with their own attachment points.

Static characteristics may be different notch filters placed between the service agent and each client attachment point, so that the presence and absence of a notch or notches allows the service agent to determine which attachment point is used by a new client.

Where dynamic characteristics are utilized, the service agent may be able to alter the channel characteristics of each individual path, so that the methods described above may be employed to decide to which attachment point or port a new client is attached dynamically. FIG. 7 depicts an example of such an embodiment. For example, a SM 700 may be connected to a segment of a power line 710 that terminates at multiple attachment points 715-718. A pedestal in a charging station with one PLC service agent 740 and four power meters 721-724 may have a different PLC bypass relay 761-764 on each path between the PLC service agent 740 and a point of attachment 715-718. In essence this configuration is four SMs that share PLC hardware. The default state of the PLC bypass relays 761-764 is open (i.e., high attenuation, but communication is still possible). When a first PEV 770 (or a second PEV 777) attaches, then the PLC service agent 740 closes one PLC bypass relay at a time while measuring the attenuation between the PEV 770 and itself. The attachment point 715-718 with the path whose PLC bypass relay 761-764 made the greatest difference in attenuation is the most likely candidate for the PEV attachment point. Verification using an external event may then commence as before.

The techniques described above can be implemented using software for execution on a computer system. For instance, the software defines procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program.

The software may be provided on a computer-readable storage medium, such as a CD-ROM, readable by a general or special purpose programmable computer or delivered over a communication medium (e.g., encoded in a propagated signal) such as network to a computer where it is executed. Each such computer program is preferably stored on or downloaded to a storage medium (e.g., solid state memory or media, or magnetic or optical media) readable by a general or special purpose programmable computer, for configuring and operating the computer system when the storage medium is read by the computer system to perform the procedures of the software.

Many other implementations of the invention other than those described above are within the invention, which is defined by the following claims.

What is claimed is:

1. A method comprising:
   receiving, at a first service agent of a powerline network, a first signal from a first client coupled to a first attachment point of the powerline network; and
   establishing a power charging association between the first service agent and the first client based, at least in part, on a difference between
   a first signal attenuation of the first signal propagated over a first signal propagation path between the first service agent and the first attachment point, and
   a second signal attenuation of the first signal propagated over a second signal propagation path, wherein the second signal propagation path is either between the first service agent and a second attachment point of the powerline network or between a second service agent and the first attachment point.

2. The method of claim 1, further comprising generating the difference based, at least in part, on the first service agent changing a communication channel characteristic of one of the first and second signal propagation paths.

3. The method of claim 2, wherein changing the communication channel characteristic comprises attenuating at least a first attenuated portion of a spectrum of a first communication channel corresponding to one of the first and second signal propagation paths relative to a second communication channel corresponding to the other of the first and second signal propagation paths, the first attenuated portion of the spectrum of the first communication channel overlapping with a predetermined spectrum of the first signal.

4. The method of claim 3, wherein the attenuating comprises applying a notch filter at a predetermined frequency location of the spectrum to only one of the first and second signal propagation paths.

5. The method of claim 2, further comprising the first service agent changing the communication channel characteristic in response to receiving a message from the first client after the first client is coupled to the first attachment point.

6. The method of claim 1, further comprising:
generating a localized event controlled by the first service agent that is detected by the first client; and
comparing a first timestamp corresponding to an initiation of the localized event by the first service agent to a second timestamp corresponding to detection of the localized event by the first client.

7. The method of claim 1, wherein the second signal propagation path is between the second service agent and the first attachment point.

8. The method of claim 1, further comprising:
switching a power relay controlled by the first service agent to start supply of power to the first client via the first attachment point;
recording a timestamp of the switching; and
sending the timestamp of the switching to the first client.

9. The method of claim 1, further comprising the first service agent causing a relay to change the first signal attenuation during propagation of the first signal from the first client.

10. The method of claim 9, wherein changing the first signal attenuation comprises changing the first signal attenuation in a sequence that is unique within the powerline network to the first service agent.

11. The method of claim 1, further comprising the first service agent causing a relay to change the second signal attenuation without changing the first signal propagation path.

12. The method of claim 2, wherein the second signal propagation path is between the first service agent and the second attachment point.

13. The method of claim 1, further comprising including a first notch filter in the first signal propagation path and a second notch filter in the second signal propagation path, wherein the first notch filter and the second notch filter have different frequency responses.

14. The method of claim 1, further comprising:
switching a first power relay in the first signal propagation path to an open state while a second power relay in the second signal propagation path is closed; and
switching the second power relay in the second signal propagation path to an open state while the first power relay in the first signal propagation path is closed.

15. The method of claim 1, further comprising receiving, at the second service agent, the first signal from the first client, the first signal propagating over the second signal propagation path between the second service agent and the first attachment point.

16. The method of claim 15, further comprising:
exchanging messages between a group of service agents including the first service agent and the second service agent, the messages including attenuation information associated with propagation of the first signal from the first client; and
determining the difference between the first signal attenuation and the second signal attenuation based, at least in part, on the attenuation information.

17. The method of claim 1, wherein establishing the power charging association between the first service agent and the first client is based, at least in part, on timing of an event associated with the first service agent.

18. The method of claim 17, wherein the event comprises initiation of a signal providing power to a battery in the first client over at least a portion of the first signal propagation path.

19. The method of claim 1, further comprising providing power to a battery in the first client over at least a portion of the first signal propagation path, after establishing the power charging association between the first service agent and the first client.

20. A powerline network, comprising:
a plurality of attachment points of the powerline network, each attachment point independently capable of being coupled with a client; and
a plurality of service agents in communication over the powerline network, wherein at least a first service agent is suitable to:
receive a first signal from a first client coupled at a first attachment point of the powerline network; and
establish a power charging association between the first service agent and the first client based, at least in part, on a difference between
a first signal attenuation of the first signal propagated over a first signal propagation path between the first service agent and the first attachment point, and
a second signal attenuation of the first signal propagated over a second signal propagation path, wherein the second signal propagation path is either between the first service agent and a second attachment point of the powerline network or between a second service agent and the first attachment point.

21. The powerline network of claim 20, further comprising at least one client coupled to the first attachment point of the powerline network.

22. The method of claim 1, further comprising transmitting a message via the powerline network, the message having at least a first signal attenuation measurement regarding the first signal received from the first client via the first signal propagation path.

23. The method of claim 1, wherein the first signal comprises a series of sounding messages from the first client received in response to the first client being coupled to the first attachment point.

24. The method of claim 1, further comprising:
matching the first client to the first attachment point based, at least in part, on the first signal attenuation being lower than the second signal attenuation.

25. The method of claim 1, wherein the first signal traverses both the first signal propagation path and the second signal propagation path, and wherein the first signal becomes more attenuated on the second signal propagation path than on the first signal propagation path.

26. The method of claim 1, wherein the first client comprises a power electric vehicle.

27. A first service agent for providing power to a power electric vehicle, the first service agent comprising:
a communication interface to couple the first service agent to a powerline network;
a processor; and
memory for storing instructions which, when executed by the processor, cause the first service agent to:
measure a power level of a sounding signal received at the first service agent from the power electric vehicle,
share information about the power level of the sounding signal received at the first service agent from the power electric vehicle, and
establish a power charging association between the first service agent and the power electric vehicle based, at least in part, on the power level of the sounding signal received at the first service agent from the power electric vehicle being higher than reduced power levels of the sounding signal detected and reported by a second service agent.

28. The first service agent of claim 27, wherein the first service agent is associated with a plurality of attachment points, each attachment point independently capable of being coupled with the power electric vehicle.

29. A method comprising:
receiving, at a plurality of service agents of a powerline network, a first signal from a first client coupled to a first attachment point of the powerline network;
measuring a first signal attenuation of the first signal propagated via a first signal propagation path between a first service agent and the first attachment point;
measuring a second signal attenuation of the first signal propagated via a second signal propagation path, wherein the second signal propagation path is either between the first service agent and a second attachment point of the powerline network or between a second service agent and the first attachment point;
identifying the first service agent to provide power to the first client based, at least in part, on a difference between the first signal attenuation and the second signal attenuation; and
establishing a power charging association between the first service agent and the first client.

30. The method of claim 29, further comprising:
providing power to a battery in the first client over at least a portion of the first signal propagation path, after establishing the power charging association between the first service agent and the first client.

* * * * *